H. M. CARTER.
Corn-Harvesters.
No. 135,403.  Patented Feb. 4, 1873.
View of the Machine.
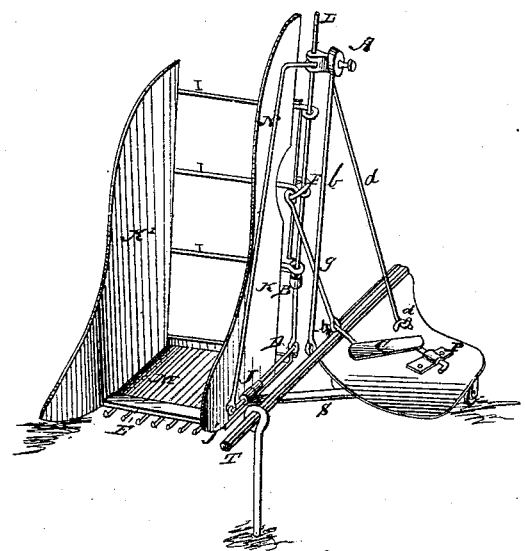
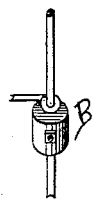
B Enlarged.
View of Back Partly Open.
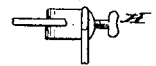
A Enlarged.
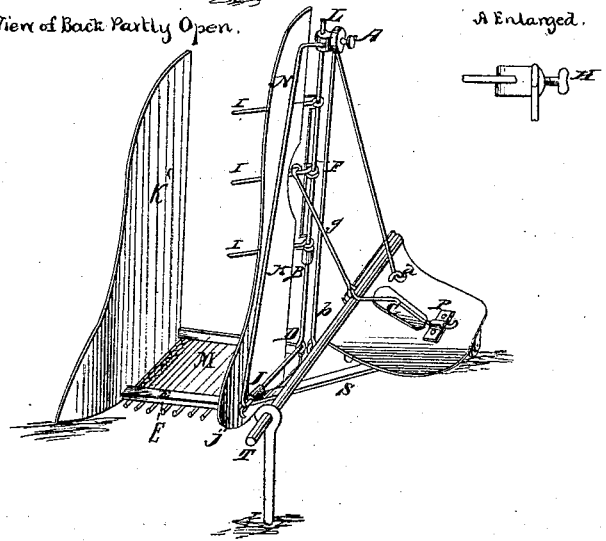
Witnesses.  Inventor.
Geo. T. Van Eyck  Henry M. Carter
Frances L. Bitting
AM. PHOTO-LITHOGRAPHIC CO. N.Y. (OSBORNES PROCESS.)

UNITED STATES PATENT OFFICE.

HENRY M. CARTER, OF LA FAYETTE, INDIANA.

IMPROVEMENT IN CORN-HARVESTERS.

Specification forming part of Letters Patent No. 135,403, dated February 4, 1873.

*To all whom it may concern:*

Be it known that I, HENRY M. CARTER, of La Fayette, county of Tippecanoe, State of Indiana, have invented certain Improvements in the Construction of Attachments to Harvesters and Mowing-Machines, for harvesting corn as it stands in the field, of which the following is a specification:

Having made certain improvements in the construction of attachments to mowing-machines and grain-reapers, by which the same can be used for harvesting corn in the field, I declare the following to be a full and correct description of my invention, reference being had to the accompanying drawing making part of this specification, in which I present—

First, a perspective view of my attachment, with the gate for supporting the stalks as closed; second, a perspective view of the same with the gate partially open.

Parts represented by similar letters in each view, in which—

P is the platform of the machine, to which the invention is supposed to be attached, and T the neap or pole of the same. S is the arm depending from the body of the machine, and carrying at its extremity the finger-bar E, which is attached to S by the joint J, through which runs the rod $j$, having a loop at both its front and rear extremities. From the rear loop of this rod $j$ there rises the vertical supporting-bar L carrying near its upper end the sleeve A, which is supported by a couple of rods, the anterior $b$ passing to and hooking into a loop on the pole T, while the posterior $d$ is secured to a loop upon the platform P. This collar A is forked and receives within it the upper end of the rod N, which is made into a loop encircling the bar L loosely. The lower end of N loops into the forward end of the rod $j$ in a loose joint. Made fast to this rod N is the vertical boot-shaped gathering-wing K, the lower part projecting some inches beyond or in front of the fingers of the machine, the anterior tip turning toward the body of the machine. The collar A has a set-screw, (see enlarged view,) H, by which the bar L and the rod N may be adjusted at any height, as required. M is a horizontal apron, fastened to the back side of the finger-bar E, to the outside of which is attached rigidly the companion vertical gathering-wing K'. The pair K and K', when in position, form a retaining compartment, into which the stalks of the corn to be harvested gather as they are cut. I I are a set of fingers, secured to each other by a retaining-bar, forming a gate, and made to turn freely on the vertical bar L, being supported in their proper position by the sleeve B, (see enlarged view,) which can be raised or lowered by a set-screw. Attached to this set of fingers or gate near the end of the middle finger is the short lever F, projecting forward and having a loop at its end from which extends a connecting-rod to the foot-piece C, which is secured upon the platform of the machine—easily reached by the foot of the driver.

Operation.

The different parts of the attachment being properly adjusted by raising or lowering the collar A, by the set-screw H, so as to allow the finger-bar E to run at the proper distance from the ground, the horses being attached, the driver takes his seat upon the platform with one foot upon the treadle C; he depresses the same, imparting power and motion through the connecting-rod $g$ to the short lever F, causing the gate I I I to close tight against the rear of the vertical wings K K'.

Now, taking a single row of corn as it stands in the field, the driver passes along with the machine cutting the stalks as he goes, which, falling backward between the wings K K', lodge against and are supported by the fingers of the gate.

When sufficient stalks have gathered to form a sheaf, the driver raises his foot, relieves the arm F of its support, the fingers I I I turn backward allowing the corn and stalks thus gathered to fall upon the ground ready for binding.

So soon as the stalks have dropped from the apron M the driver depresses the foot-piece C; thus drawing upon the arm F causes the gate again to close ready for the retention of other stalks which shall form another sheaf.

Having thus described the construction and working of my invention, what I claim, and desire to secure by Letters Patent, is—

1. The combination of the retaining-gate I I, lever F, connecting-rod $g$, and foot-piece C.

2. The combination of the bracing rods $a\ b$, the collar A, and the vertical bar L, by which the height of the cutter-bar and platform or apron M may be regulated.

HENRY M. CARTER.

Witnesses:
C. W. COTTON,
RICHARD HARRIS.